UNITED STATES PATENT OFFICE.

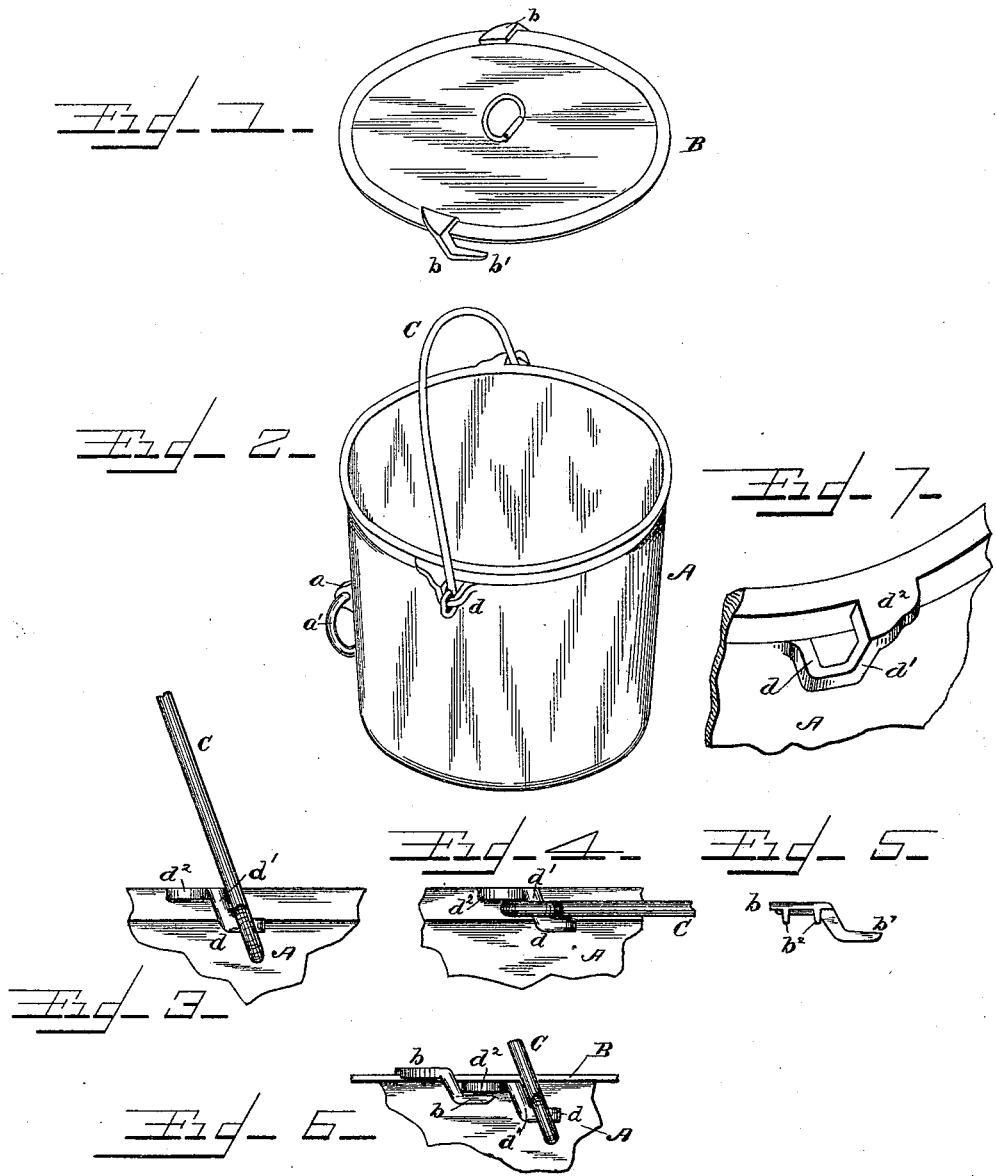

MATTHEW GRISWOLD AND MATTHEW GRISWOLD, JR., OF ERIE, PENNSYLVANIA.

KETTLE EAR AND COVER.

SPECIFICATION forming part of Letters Patent No. 447,821, dated March 10, 1891.

Application filed October 15, 1890. Serial No. 368,196. (No model.)

*To all whom it may concern:*

Be it known that we, MATTHEW GRISWOLD and MATTHEW GRISWOLD, Jr., both citizens of the United States, and residents of Erie, county of Erie, and State of Pennsylvania, have invented a new and useful Improvement in Kettles, of which the following is a full, clear, and exact description, reference being had to the accompanying drawings, making part of this specification.

Our invention relates to the construction of the ears of the kettle and the manner of combining the bail therewith, and to the construction of the hooks or pendent lugs on the top or cover for engaging said ears and holding the cover in place.

It consists in making the ears in angular form with the laterally-projecting part on one side of the bail on a higher plane than that on the other side, the two parts being connected at their outer ends by an angular web, inside of which and between the upper and lower parts of the ear the slot or perforation for the bail is formed, the arrangement being such that the upper and lower parts of the ear form one a rest and the other a stop for the bail, accordingly as the bail is raised or thrown down, in connecting the bail with the connecting-web portion of the ear lying parallel with the side of the kettle, whereby greater freedom of movement of the end of the bail connected with the ear, together with the stopping action referred to, is obtained.

It further consists in the novel form or construction of the cover-hooks for engaging the kettle-ears and in the manner of uniting them to the lid or cover, as hereinafter described and claimed.

In the accompanying drawings, Figure 1 is a perspective view of the lid or cover, and Fig. 2 a similar view of the kettle. Fig. 3 is a side elevation showing one ear of the kettle with the bail applied and in elevated position, and Fig. 4 a similar view with the bail depressed. Fig. 5 is a side elevation of one of the cover-hooks detached; and Fig. 6 is a side elevation, similar to Fig. 4, with the cover applied and the cover-hook engaging the ear of the kettle. Fig. 7 is an enlarged perspective view of one of the kettle-ears and a portion of the kettle with the bail omitted.

A indicates the kettle, and B the lid or cover therefor. The kettle shown is of the ordinary flat-bottom kind, provided on one side with a perforated lug or ear $a$, carrying a ring $a'$ for facilitating the tilting of the kettle in use. It is provided on opposite sides at its open upper end with ears made in the slotted and angular form indicated with the laterally-projecting portion $d^2$ on one side of the slot, that nearest the ring $a'$ in a higher plane than that $d$ on the other side of the slot or perforation, the two parts of which ear are connected at their outer ends by an angular web, (indicated at $d'$.) The end of the bail is bent in loop form around this angular connecting-web, and the horizontal portion of said web lying parallel with the side of the kettle forms the bearing for the end of the bail C when the bail is raised into vertical position for lifting the kettle, as shown in Figs. 2, 3, and 6, the ends of the loops of the bail swinging around upon the upright parts of the connecting-webs when the bail is depressed, as shown in Fig. 4. The upper and lower portions of the ear are sufficiently removed from the same plane, both horizontal and vertical, to accommodate the bail between them and the ends of the bail being passed down between said portions and then bent outward, up, and over the connecting-webs to form the retaining-loops, it will be seen that when the bail is thrown down, as shown in Fig. 4, it rests on the lower portion of the ear, while the loop underlies the upper portion thereof, which forms a stop, preventing the bail from falling below a substantially horizontal position or down against the side of the kettle and becoming heated thereby. On the other hand, when the bail is raised and the ring $a'$ grasped for tilting the kettle, the bail rests against the inner side of the upper portion of the ear and the loop against the adjacent side of the lower portion of the ear, thereby preventing the bail from passing beyond an upright position most favorable for dumping or emptying the kettle without endangering the scalding of the hand from the steam or heat rising from the contents of the kettle. By connecting the bail-loops with the connecting-web of the ears lying parallel with the sides of the kettle they are allowed free play between the upper and lower portions of the ears, and the latter are thus made to form stops and rests for the bail, as explained. We prefer to set the upper and lower portions of the ears sufficiently apart in their vertical relation to allow the bail to pass slightly beyond a vertical position, as it is thereby adapted to be left standing in that position to avoid its becoming heated or for other purposes, if desired.

The upper portion of the ears on their outer edges are provided with horizontal flanges or extensions $d^2$, with which hooks or clips $b$ on the lid or cover B engage for holding the cover in place. These flanges are both on the side nearest the tilting ring $a'$, and serve to prevent the lid from sliding off when the kettle is tilted for draining or other purpose, while at the same time this arrangement facilitates sliding the cover on or off.

The cover hooks or clips $b$ are cast of malleable metal in the angular form shown in Figs. 1 and 5, the lower horizontal lip portion $b'$ thereof forming the hook or lip portion, which engages the ear-flange $d^2$ of the ear. The upper part extending over the edge of the cover has one or more pendent spurs $b^2$ formed on it, which are driven through the sheet-metal cover and being clinched or riveted thereto obviate the necessity for separate rivets for uniting the cover hooks or clips to the cover and form a simple, inexpensive, and durable fastening.

Having thus described our invention, what we claim as new, and desire to secure by Letters Patent, is—

1. A kettle provided with perforated ears for receiving the bail, located approximately on opposite sides of the kettle, and composed each of two laterally-projecting portions lying in different horizontal planes and connected by an angular web, around which the bail is looped, substantially as described.

2. A kettle-ear having the upper and lower portions located in different horizontal planes, and a web connecting said portions, in combination with a bail looped around said web, substantially as described.

3. The kettle having the ears which receive the bail formed with the extended side flanges $d^2$, both facing the same side of the kettle and located at the upper edge thereof, in combination with a cover having angular clips or hooks arranged to pass beneath and engage said ear-flanges, substantially as described.

In testimony whereof we have hereunto set our hands.

MATTHEW GRISWOLD.
MATTHEW GRISWOLD, Jr.

Witnesses:
HENRY J. RAYMORE,
MARVIN GRISWOLD.